United States Patent
Oki et al.

(10) Patent No.: US 8,070,353 B2
(45) Date of Patent: Dec. 6, 2011

(54) HORIZONTAL MIXER

(75) Inventors: Yuzuru Oki, Kanagawa-ken (JP); Masami Umetsu, Kanagawa-ken (JP); Takahiro Hasegawa, Kanagawa-ken (JP)

(73) Assignee: Oshikiri Machinery Ltd., Kanagawa-ken (JP)

( * ) Notice: Subject to any disclaimer, the term of this patent is extended or adjusted under 35 U.S.C. 154(b) by 371 days.

(21) Appl. No.: 12/413,034

(22) Filed: Mar. 27, 2009

(65) Prior Publication Data

US 2009/0245016 A1    Oct. 1, 2009

(30) Foreign Application Priority Data

Mar. 28, 2008   (JP) ................. 2008-086613

(51) Int. Cl.
*B01F 15/02*   (2006.01)
(52) U.S. Cl. ............. 366/182.4; 366/347; 220/254.3
(58) Field of Classification Search ........ 366/182.4, 366/347; 220/254.3
See application file for complete search history.

(56) References Cited

U.S. PATENT DOCUMENTS

| 202,129 | A | * | 4/1878 | White | 220/254.3 |
| 2,011,494 | A | * | 8/1935 | Lauterbur | 366/77 |
| 4,993,606 | A | * | 2/1991 | Bolen et al. | 222/546 |

FOREIGN PATENT DOCUMENTS

JP       9-248119    9/1997

* cited by examiner

*Primary Examiner* — David L. Sorkin
(74) *Attorney, Agent, or Firm* — Wenderoth, Lind & Ponack, L.L.P.

(57) ABSTRACT

An easily cleanable horizontal mixer. This horizontal mixer (10) includes a mixing bowl (18) having an upper opening, a material feed port (20), a roof (22) configured so as to close the upper opening, a material feed tube (24) attached to the roof and extending upwardly from a periphery of the material feed port to define a material feed passage extending through the material feed port, and the lid (26) disposed in the material feed tube. The mixing bowl has a bottom wall (14), a peripheral wall (16) extending from the periphery of the bottom wall to the upper opening, and a scraper plate (32) at an upper end (16b) of the peripheral wall. The lid has an inner surface (26a) that is, at a position to close the material feed port, brought into a position where the inner surface is flush with an inner surface (22a) of the roof.

2 Claims, 5 Drawing Sheets

[FIG. 1]
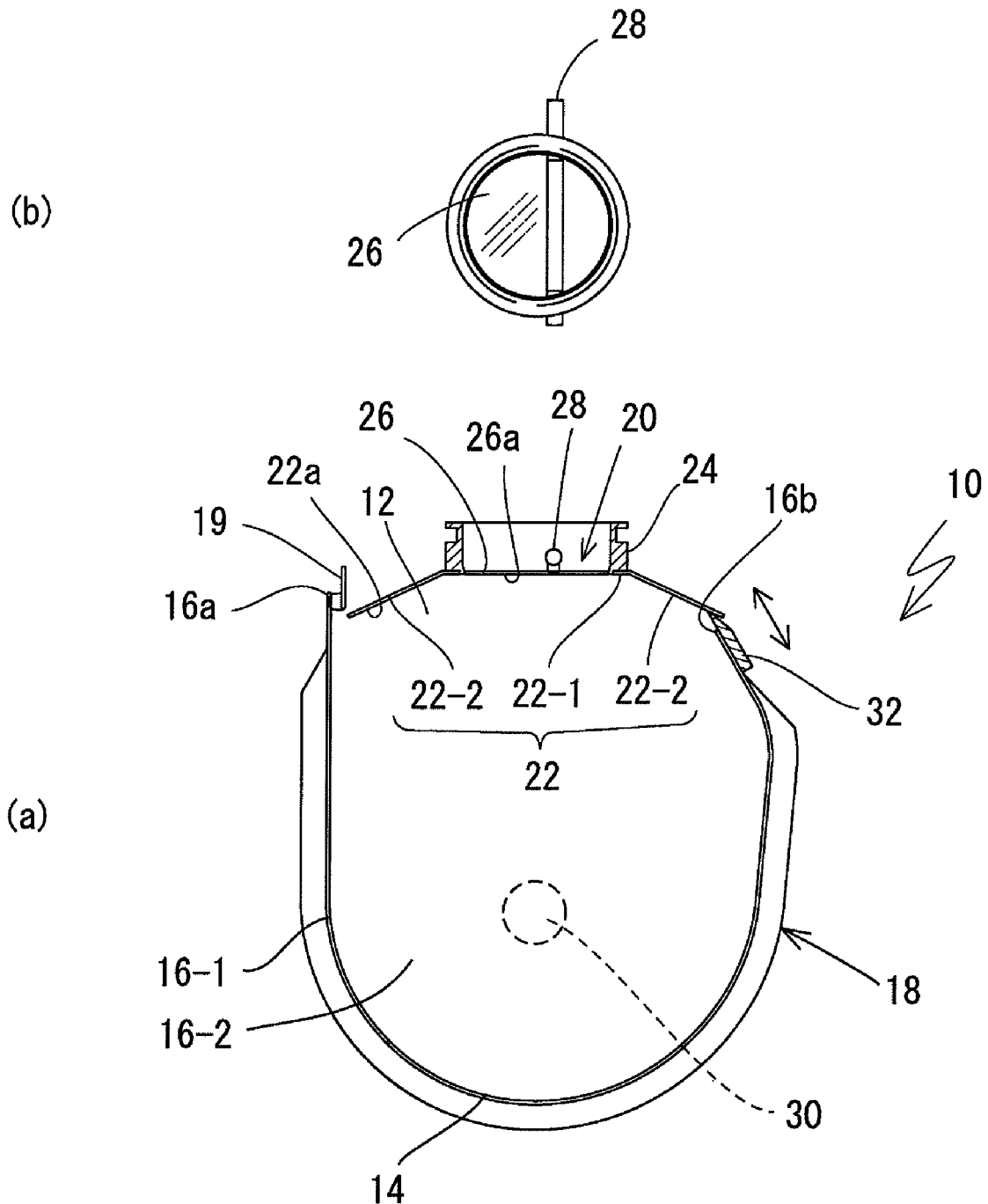

[FIG. 2]
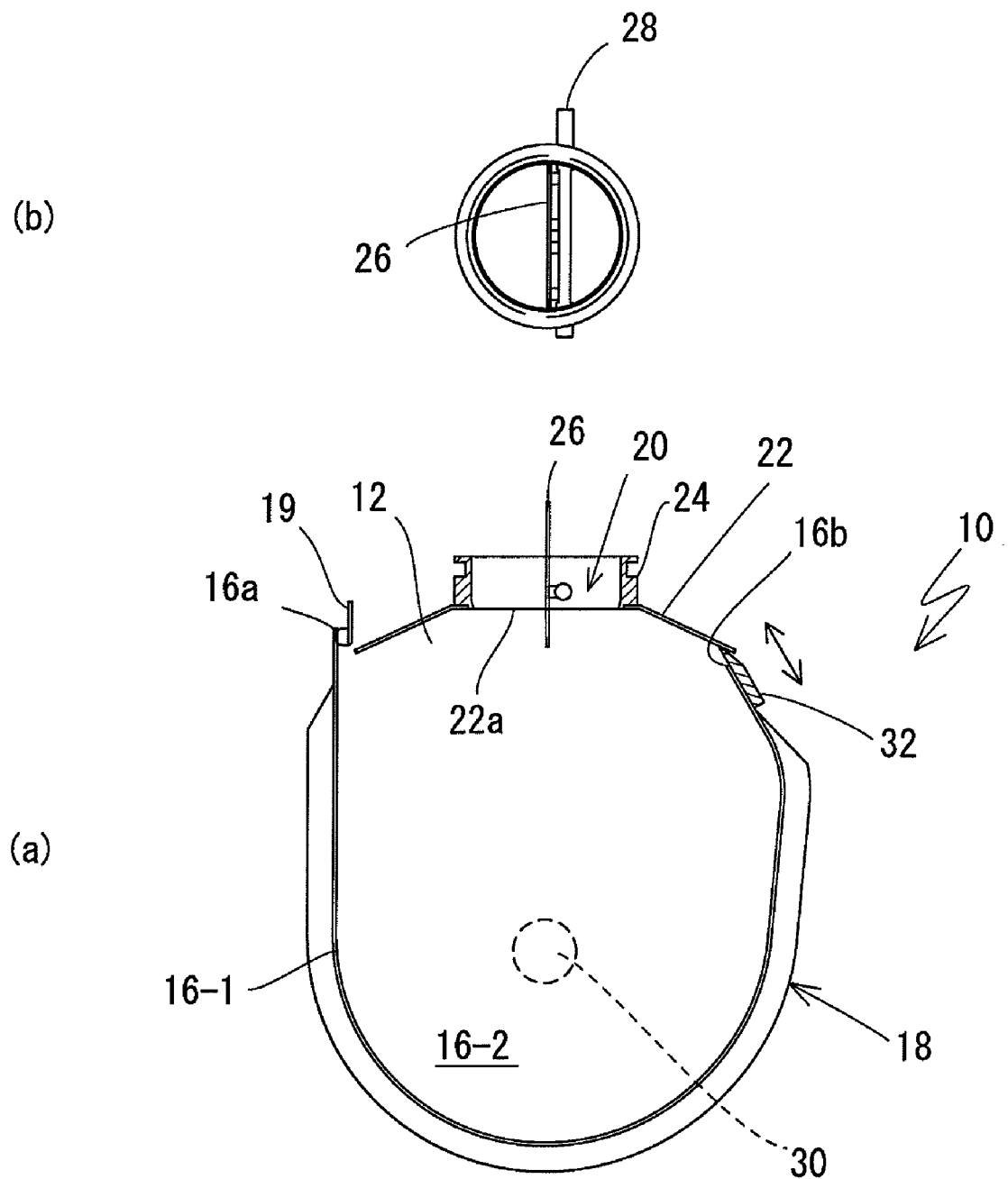

[FIG. 3]
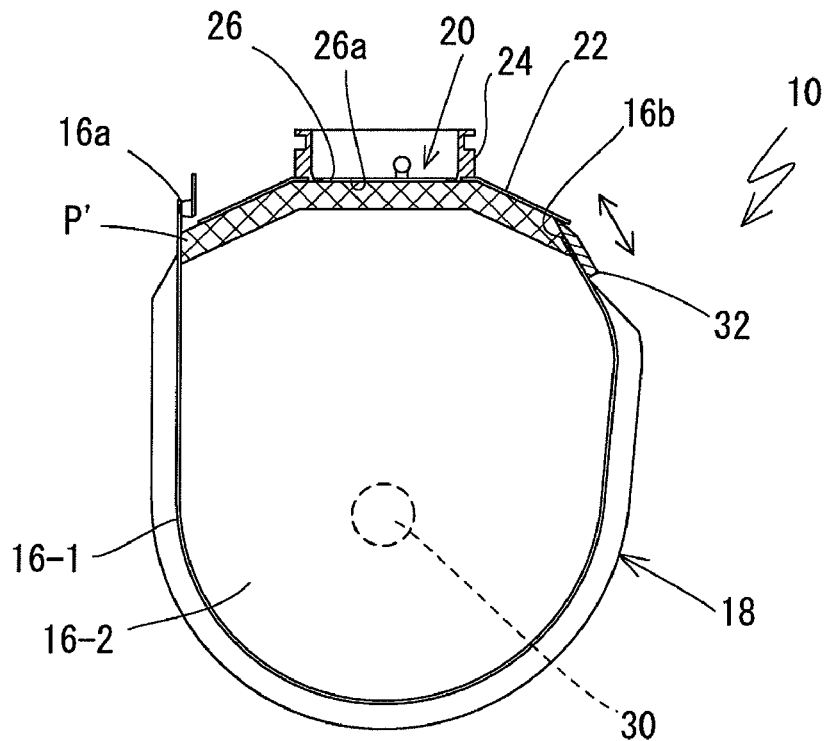
[FIG. 4]
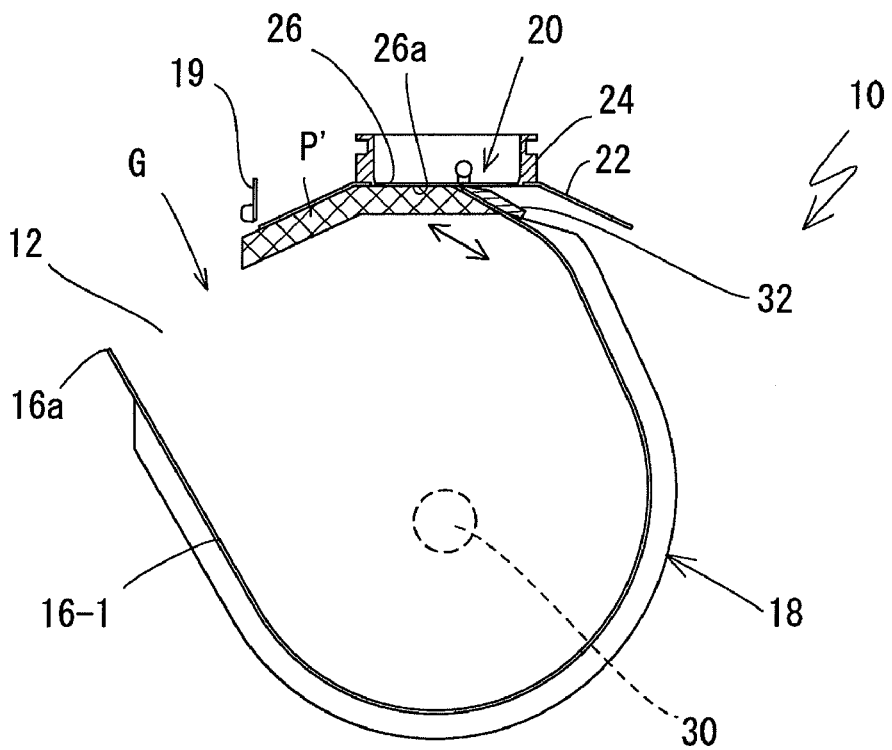

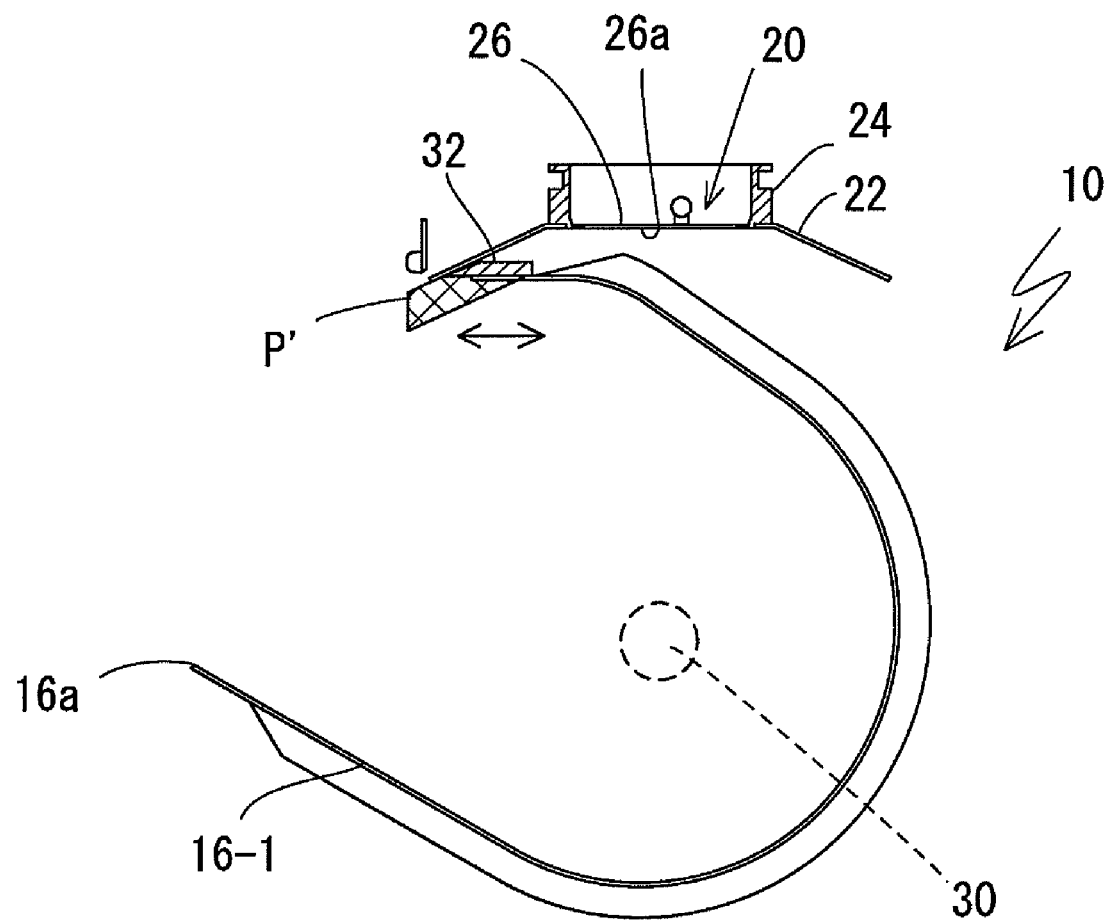
[FIG. 5]

[FIG. 6]
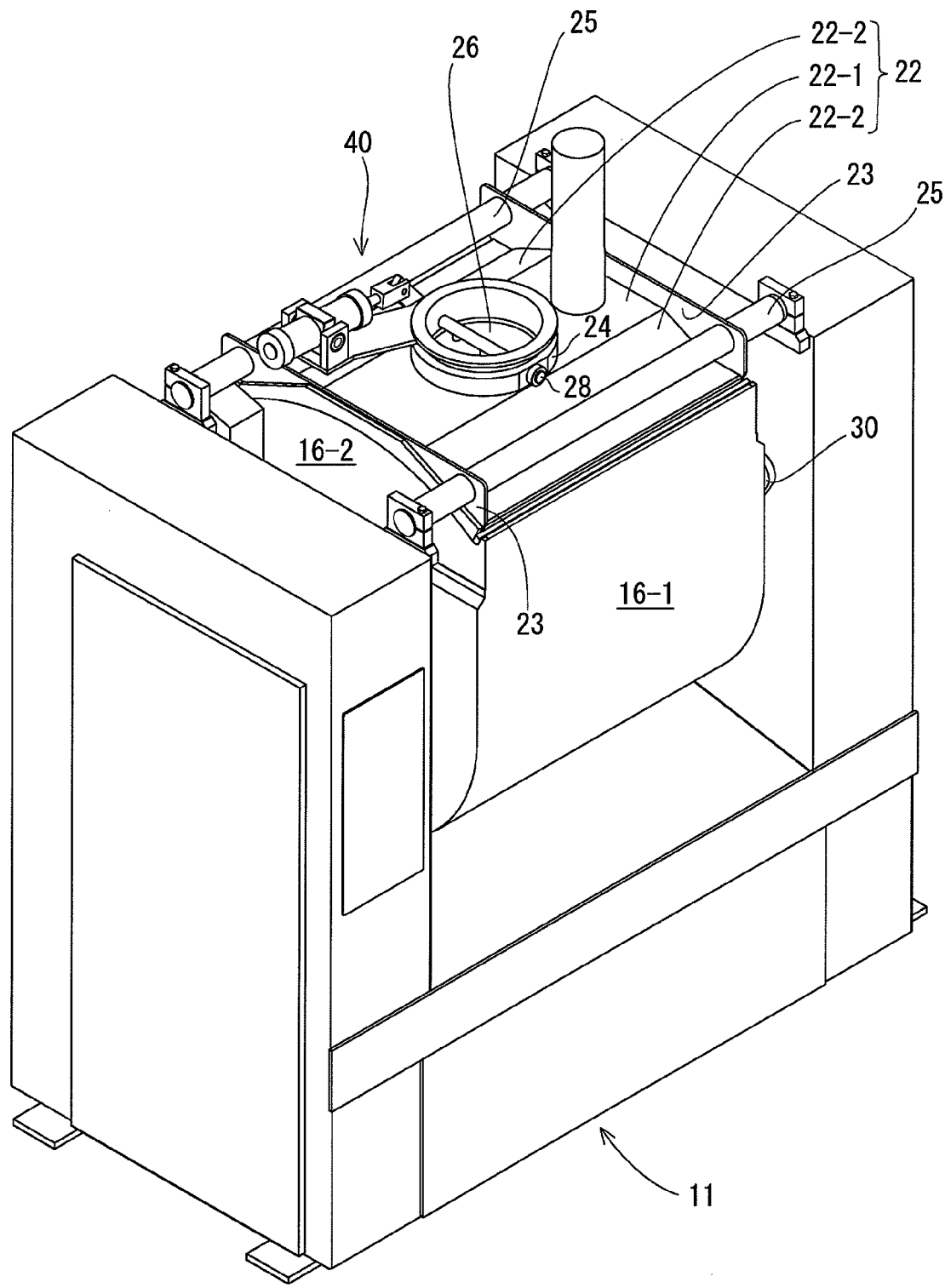

HORIZONTAL MIXER

FIELD AND BACKGROUND OF THE INVENTION

The present invention relates to a mixer, more particularly, to a horizontal mixer suitable for mixing of materials to make bread dough in bread making.

DESCRIPTION OF THE RELATED ART

General-purpose horizontal mixers include a mixing bowl having an upper opening, a roof configured so as to close the upper opening and having a material feed port, a material feed tube having a material feed passage extending upwardly from the periphery of the material feed port, a rotatable lid disposed in the vertically intermediate portion of the material feed passage, and being rotatable between a closed position to close the material feed passage and an open position to open the material feed passage, and an agitating blade rotatably driven in the mixing bowl around a horizontal axis. Materials fed through the material feed passage into the mixing bowl are agitated by means of the agitating blade (Japanese Unexamined Patent Application Publication No. 09-248119).

In these conventional horizontal mixers, material agitated by means of the agitating blade splashes and adheres to the inner surface of the roof and the inside of the material feed tube, which makes cleaning of the mixer difficult. Further, there has been a problem that if dough adhering to the roof and solidified there falls down, it may be mixed into prepared dough. Therefore, the object of the present invention is to solve the problem like this.

SUMMARY OF THE INVENTION

The present invention provides the horizontal mixer (10) including the mixing bowl (18) having an upper opening (12), the roof (22) configured to close the upper opening and having the material feed port (20), the material feed tube (24) that is attached to the roof and extending upwardly from a periphery of the material feed port to define the material feed passage extending through the material feed port, and the lid (26) disposed in the material feed tube and being displaceable between a closed position to close the material feed port and an open position to open the material feed port. The lid has an inner surface that is, at the closed position, brought into a position where the inner surface is flush with an inner surface (22a) of the roof.

The above phrase "The lid has an inner surface that is, at the closed position, brought into a position where the inner surface (26a) is flush with an inner surface of the roof." means not only a state where the inner surface of the lid is perfectly flush with the inner surface of the roof, but also a state where there is a slight difference in level, which does not impair easy cleanability.

As for this mixer, when the mixing bowl is at a mixing position, the lid is at the closed position and the inner surface of the lid is flush with the inner surface of the roof. This makes it easy to splashed remove material adhering to the inner surface of the lid and the inner surface of the roof, thereby enabling easy cleaning of the mixer.

Further, the mixing bowl includes a bottom wall and a peripheral wall (16-1, 16-2) extending upward from the bottom wall thereof to the upper opening, and has, at an upper end (16b) of the peripheral wall defining the upper opening, a scraper plate made of resilient material, and wherein the scraper plate relatively slides on the inner surface of the roof when the mixing bowl is moved relative to the roof for taking mixed material out of the mixing bowl.

Furthermore, the mixing bowl is rotatable about the horizontal axis between a position for mixing material in the mixing bowl and a position for taking out the material from the mixing bowl, and the scraper plate relatively slides on the inner surface of the roof when the mixing bowl is rotated from the material mixing position to the material taking out position.

The roof has a bent structure composed of a plurality of planes.

Further, the scraper plate is urged against the inner surface of the roof so as to resiliently engage with the inner surface of the roof.

The scraper plate is in engagement with the inner surface of the roof by moving the mixing bowl relative to the roof when mixed material is taken out. Thus, the scraper plate makes it easy to remove splashed material adhering to the inner surface of the lid and the inner surface of the roof every time the mixing bowl is rotated from the mixing position to the material taking out position. Therefore, the splashed material is not left over to the next mixing operation, which can avoid mixing the splashed material into dough, whereby mixing can be performed in clean condition An embodiment of the horizontal mixer according to the present invention is described as follows with reference to the accompanying drawings.

BRIEF DESCRIPTION OF THE DRAWINGS

FIG. 1 shows an outline of a principle part of the horizontal mixer according to the present invention. FIG. 1(a) is a vertical sectional side view thereof, showing a state in which the lid is at the closed position to close the material feed port. FIG. 1(b) is a top view of the material feed tube in the above state.

FIG. 2 is a view similar to FIG. 1. FIG. 2(a) shows a state in which the lid is at the open position to open the material feed port on the horizontal mixer. FIG. 2(b) is a top view of the material feed tube in the above state.

FIG. 3 shows a state in which material has adhered to the inner surface of the lid, and the inner surface of the roof in the horizontal mixer.

FIG. 4 shows a state in which the horizontal mixer is being rotated from the mixing position to the material taking out position and adhering material P' is scraped off by means of the scraper plate.

FIG. 5 shows a state in which the horizontal mixer has been rotated from the mixing position to the material taking out position and the adhering material P' has been almost completely scraped off.

FIG. 6 is a perspective view showing the whole of the horizontal mixer according to the present invention.

DESCRIPTION OF THE PREFERRED EMBODIMENT:

Referring to the drawings, the horizontal mixer 10 according to the present invention includes the mixing bowl 18 shown in cross section in FIGS. 1 to 5, the roof 22 configured so as to close the upper opening 12 of the mixing bowl, and a frame 11 (FIG. 6) for supporting the mixing bowl 18 and the roof 22.

The mixing bowl 18 is composed of a U-shaped wall 16-1 and a pair of plate-like walls 16-2 to close the open sides of the U-shaped wall. The mixing bowl is provided therein with the rotating agitating blade (not shown) for mixing and kneading fed materials such as flour and water.

The pair of plate-like walls 16-2 are rotatably supported by means of a pair of supporting shafts 30 extending from the frame 11 and aligned with each other in the horizontal direction. The pair of plate-like walls are rotatable between the mixing position (FIGS. 1 to 3) for mixing and kneading fed material and the material taking out position (FIG. 5) for taking mixed material out of the mixing bowl 18.

The roof 22 is formed of a bent plate-like member, which has a central horizontal portion 22-1 and inclined portions 22-2 disposed on both sides of the central horizontal portion. The central horizontal portion 22-1 is provided with the material feed port 20 and the tubular material feed tube 24 extending upwardly from the periphery of the material feed port. The material feed tube 24 is provided therein with the lid 26 configured to be rotatable about a horizontal shaft 28 between the closed position (FIG. 1) to close the material feed port 20 and the open position (FIG. 2) to open the material feed port 20. The inner surface 26a of the lid 26 is disposed to be flush with the inner surface 22a of the roof 22 when the lid 26 is at the closed position. As shown in FIG. 6, the roof 22 has flanges 23 disposed along both ends, respectively, and a pair of horizontal supporting bars 25 secured to the frame 11 pass through the flanges, whereby the roof 22 is secured to the frame.

The mixing bowl 18 has the scraper plate 32 made of resilient material such as plastic at 16b, one of upper ends of the U-shaped wall 16-1, 16a and 16b. The scraper plate 32 is an elongated plate-like member disposed along the upper end 16b. The scraper plate 32 extends upwardly beyond the upper end 16b by a slight amount. When the mixing bowl 18 is at the mixing position, the scraper plate 32 engages with the lower surface of the roof 22 at one end of the roof (the right end in the illustrated example). When the mixing bowl 18 is rotated relative to the roof 22 for taking mixed material out of the mixing bowl 18, the scraper plate 32 slides along the inner surface 22a of the roof. In the illustrated example, when the mixing bowl 18 is moved from the material taking out position back to the mixing position, the upper end 16a engages with a stopper 19 to stop the mixing bowl.

The followings describe an example of the operation of the horizontal mixer 10.

First, the lid 26 of the mixing bowl 18 is rotated to the open position (FIG. 2b) of the material feed port 20, and then flour is fed from the material feed tube 24. After that, the lid 26 is rotated to the closed position (FIG. 1b) of the material feed port 20. In this state, the inner surface 26a of the lid 26 is flush with the inner surface 22a of the roof 22, i.e., the inner surface 22a of the roof and the inner surface of the lid form a single continuous surface together.

Then, the mixing bowl 18 is rotated about the rotating shafts 30 (FIG. 4), which provides a gap G between the roof 22 and the peripheral wall 16. Then, water and other materials are fed from the gap G. After that, the mixing bowl 18 is moved back to the original vertical position, then the agitating blade is actuated to perform mixing.

When the mixing is finished, material P' splashed by the agitating blade adheres to the inner surface 26a of the lid 26, and the inner surface 22a of the roof 22 (FIG. 3).

When the mixing bowl 18 is rotated from the mixing position to the material taking out position, the scraper plate 32 slides on the inner surface 26a of the lid 26, and the inner surface 22a of the roof 22, thereby scraping off the adhering material P' (FIGS. 4, 5). This can substantially prevent material from adhering to the material feed tube and remaining there in this case, whereby it facilitates easy cleaning of the mixer compared with that of the above-described conventional mixer.

It has been confirmed that the scraped material P' in the above case has almost the same property as prepared dough, therefore, the mixing of the material P' into the prepared dough in the mixing bowl 18 does not have an adverse effect on bread making.

The present invention is not limited to the above-described embodiment. The roof 22 is formed of a bent plate-like member in the illustrated example, whereas the roof may have an arc-shaped cross section as well. Further, a resilient plastic member is used for a scraper plate 32, whereas a metal plate may be used so as to be urged against the inner surface 22a of the roof through an urging means such as a spring as an alternative example. A spring and an air cylinder can be utilized for urging the scraper plate. In a case where the air cylinder is used, the air cylinder may be configured to urge the scraper plate against the roof only when the scraper plate scrapes splashed material adhering to the roof.

Means for rotating the lid includes, but is not limited to, a piston-cylinder mechanism 40 shown in FIG. 6. The lid 26 is configured to be rotatable in the embodiment of the present invention, whereas the lid may be configured to be slidable as well.

In the embodiment of the present invention, the present invention is applied to a mixer for making bread dough. However, applications of the present invention are not limited to the mixer for making bread dough. It is apparent that the present invention can also be applied to a horizontal agitator for mixing and kneading a plurality of materials.

What is claimed is:

1. A horizontal mixer comprising:
   a mixing bowl having an upper opening;
   a roof configured to close the upper opening and having a material feed port;
   a material feed tube attached to the roof and extending upwardly from a periphery of the material feed port to define a material feed passage extending through the material feed port; and,
   a lid disposed in the material feed tube and being displaceable between a closed position to close the material feed port and an open position to open the material feed port,
   wherein the lid has an inner surface that is, at the closed position, brought into a position where the inner surface is flush with an inner surface of the roof,
   wherein the mixing bowl includes a bottom wall and a peripheral wall extending upward from the bottom wall thereof to the upper opening, and has, at an upper end of the peripheral wall defining the upper opening, a scraper plate made of resilient material, and
   wherein the scraper plate relatively slides on the inner surface of the roof when the mixing bowl is moved relative to the roof for taking mixed material out of the mixing bowl.

2. A horizontal mixer according to claim 1, wherein the mixing bowl is rotatable about a horizontal axis between a position for mixing material in the mixing bowl and a position for taking out the material from the mixing bowl, and the scraper plate relatively slides on the inner surface of the roof when the mixing bowl is rotated from the material mixing position to the material taking out position.

* * * * *